United States Patent Office 3,049,499
Patented Aug. 14, 1962

3,049,499
ADDITION POLYMER OF CYANOGEN AND A DIAMINE
Ken Matsuda, Stamford, Conn., assignor to American Cyanamid Company, New York, N.Y., a corporation of Maine
No Drawing. Filed May 19, 1958, Ser. No. 735,974
12 Claims. (Cl. 260—2)

This invention relates to novel polymeric material and to the method of preparation thereof. More particularly, the invention relates to the preparation of soluble polyoxamidines through the addition polymerization of cyanogen with diamines.

The reaction of cyanogen with diamines has heretofore been conducted, see Journal of Organic Chemistry, volume 22, pages 895–899 and U.S. 2,819,262. However, in each case the reaction proceeds through an unstable oxamidine intermediate formed by the addition of two molecules of the diamine to one of cyanogen

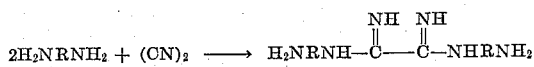

wherein R is a radical such as an alkylene oxoxyalkylene (i.e. ether) radical. According to the prior art, this is followed by intramolecular loss of ammonia with the formation of a bicyclic product in those cases where the potential ring contains from five to seven members.

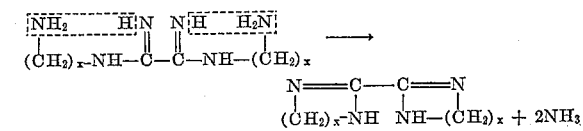

wherein $x$ is an integer of from 2 to 4.

When the potential ring contains more than seven members, i.e. where $x$ is greater than 4 or, in the case of the p-phenylenediamine derivative, where ring formation is impossible, there occurs intermolecular loss of ammonia to form a cross-linked condensation polymer

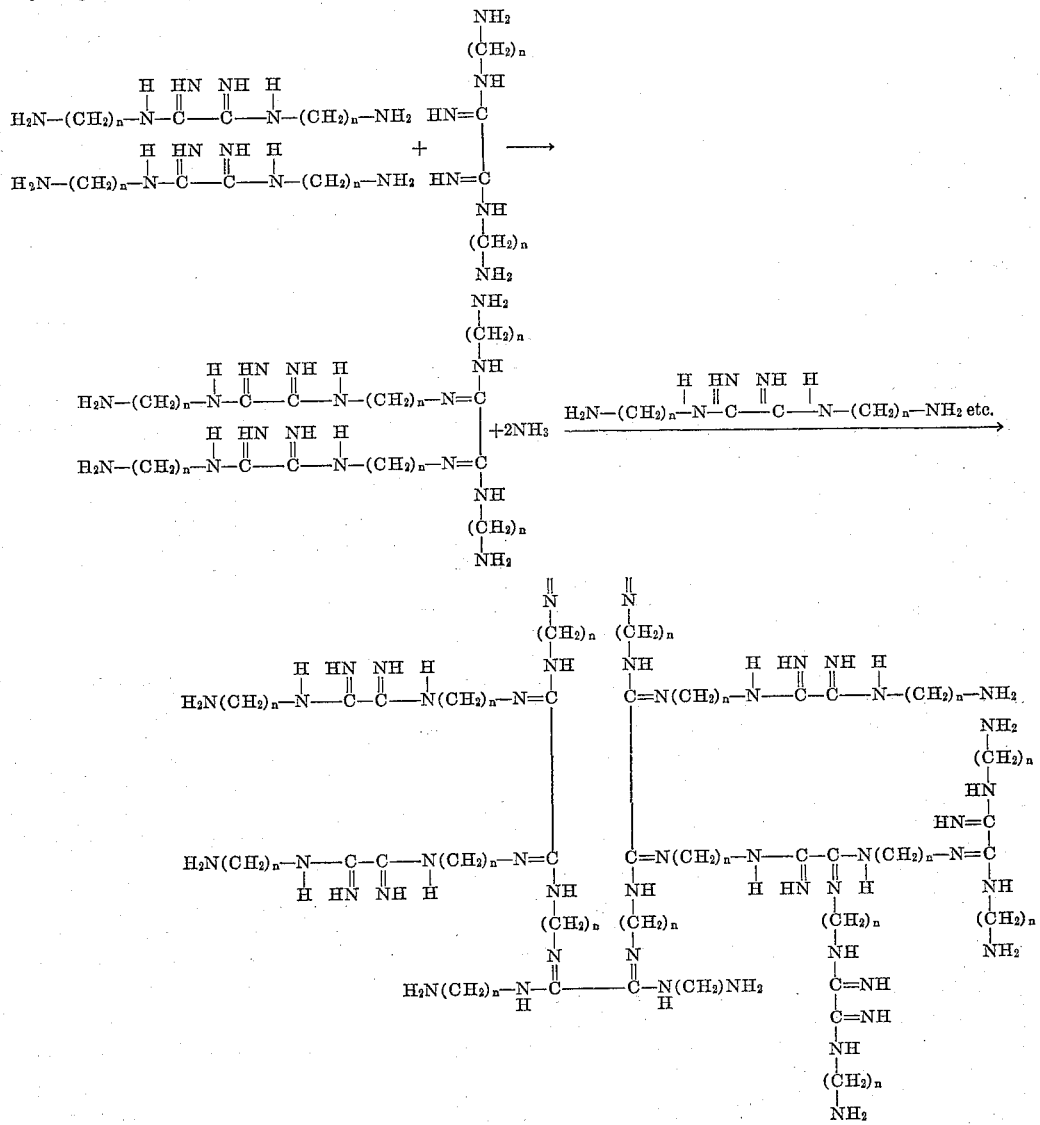

This cross-linked condensation polymer is a reddish sticky mass which is insoluble in water and organic solvents, and is attacked only by hot concentrated nitric or sulfuric acids. To my knowledge, no prior technique is known wherein a soluble addition polymer may be derived directly from the reaction of diamines with cyanogen.

The polymeric products of this invention differ from those of prior art in that they are addition rather than condensation polymers and they are formed by reaction at substantially equimolar proportions of diamine with one molecule of cyanogen.

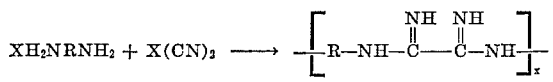

The addition polymer of the invention is readily soluble in dilute mineral acids such as sulfuric, nitric, hydrochloric, and in acetic acid, whereas the condensation product of the prior art is substantially insoluble in these solvents as well as in concentrated hydrochloric acid, being attached only by concentrated sulfuric or nitric acids.

It is an object of the present invention to prepare addition polymers by reacting cyanogen and diamines in specified proportions and by a simple and expeditious procedure. The reaction is conducted at relatively low temperatures and without necessity of employing catalysts or initiators.

Further objects will become apparent as the description of the invention proceeds.

The diamines which reacted with cyanogen to produce the novel addition products according to the invention are those having the general formula:

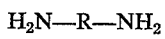

wherein R is selected from the group consisting of alkylene radicals of 2–12 carbon atoms, an arylene radical, an oxy ether radical, and a thioether radical. The reaction is conducted at temperatures which may vary from about −20° C. up to about the refluxing temperature of the organic reaction medium. Preferably, temperatures varying between about 0° C. to about 70° C. are employed.

The reaction medium may be any one of various organic materials which are solvents for cyanogen which, because of its boiling point of −21° C., is preferably reacted in such organic solvents. The organic reaction medium should preferably have a boiling point above about 50° C. Suitable organic liquids which may be utilized are such as methanol, ethanol, dioxane, ethyl acetate, hexane, cyclohexane, pentane, heptane and their mixtures, for example, as well as substituted hydrocarbons such as carbon tetrachloride or tetrahydrofuran, for example. Preferably, at least a 2:1 weight ratio of organic medium to reactants is employed. There is no criticality in the upper ratio of organic material, although as a practical limitation a ratio of up to about 10:1 may be employed.

No catalyst need be employed and preferably none is used, although the use of conventional amounts of catalyst is not precluded. The reaction is continued for a period of time varying from at least about 5 minutes until essentially complete precipitation of the polymer materials takes place. The reaction product may be washed, centrifuged and dried by any convenient means or it may be used directly in some applications.

Suitable diamines of the above formula which may be employed with cyanogen in preparing the polyamidines of the invention are such as the alkylene diamines, e.g. ethylenediamine, trimethylenediamine, propylenediamine, tetramethylenediamine, pentamethylenediamine, hexamethylenediamine, decamethylenediamine, and the like; the arylene diamines, i.e. ring compounds having two amine radicals anywhere on the ring structure, such as phenyldiamine, benzidine, dionisidine, toluidine, the various isomers of naphthylene diamine such as 1,2-naphthylene diamine, 2,3-naphthylene diamine, 1,4-naphthylene diamine; various oxyether and thio ether diamines, preferably those containing hydrocarbon units, i.e. alkyl or aryl oxide units of less than 8 carbon atoms. Illustrative examples of oxy ethers are compounds such as 1,1′-oxybismethylamine, 2,2′-oxybisethylamine, 3,3′-oxybispropylamine, 4,4′-oxybistetramethylamine, 6,6′-oxybishexamethylamine, 2,2′-oxybispropylamine, ethyloxypropyldiamine, oxybisphenylamine, propyloxyphenyldiamine, and the like. Illustrative examples of diamine thio ether compounds, including dithio ethers, are compounds such as 2,2′-thiobisethylamine, 2,2′-dithiobispropylamine, 3,3′-thiobispropylamine, 2,2′-thiobispropylamine, 3,3′-dithiobispropylamine, 4,4′-thiobistetramethylamine, 2-ethyl-thio-2-propyldiamine, 2-propyl-thio-p-methyltoludiamine, and the like.

Atmospheric pressures are preferably employed during the reaction between the cyanogen and the diamines, although pressures close thereto may be employed, such as from about 0.8 to 2 atmospheres. The amount of cyanogen to diamine should be employed in substantially equimolar amounts, although some excess of cyanogen may be tolerated. The mole ratio of cyanogen to diamine should be within the limits of 0.8:1 to 3:1 and preferably within the mole ratio limits of 0.9:1 to 1.5:1.

In order that the present invention may be more fully understood, the following examples are set forth for purposes of illustration only and any specific enumeration of detail should not be intended as a limitation except as specified in the appended claims. All parts are parts by weight unless otherwise stated.

*Example 1*

To a vigorously stirred solution of 44 parts of tetramethylenediamine in 236 parts ethanol maintained at 0–5° C. was added 26 parts cyanogen gas over a 20-minute period. The mixture was stirred for 6 hours at 0–5° C. and then allowed to reach room temperature overnight. The resulting light orange gel was stripped of ethanol and dried to yield a light orange solid which when heated darkened at 160° C. but did not melt even when heated up to 300° C. The polymer, believed to have the recurring formula

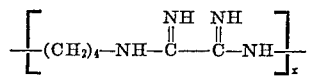

is soluble in acetic acid and in dilute mineral acids and also slightly soluble in water and organic solvents. The polymer may be dissolved in dilute aqueous HCl, treated with charcoal, filtered and reprecipitated with dilute aqueous NaOH to yield an almost colorless product.

The molecular weight of products made according to the above procedure, as estimated by intrinsic viscosity measurements, is in the range 2,000–50,000 and even higher in some cases. Generally, higher proportions of cyanogen lower the molecular weight because of the tendency of cyanogen units to terminate the chain.

*Example 2*

52 parts of cyanogen is added to a solution of 116 parts of hexamethylenediamine in 354 parts of absolute alcohol. The solution is kept at 15–30° C. and stirred rapidly. The addition of cyanogen is made over a 1-hour period. The mixture is stirred at 10–20° C. for three more hours. Gelling occurs after 1½ hours of additional stirring at room temperature (25° C.). Evaporation of the solvent produced 178 parts of a brittle orange solid. When this material is dissolved in dilute aqueous HCl, concentration about 5–15%, heated with decolorizing charcoal and precipitated with NaOH, a light yellow powder is obtained which does not melt. The product, upon heating to 155° C., changes to a deep red-brown color which blackens when heated at 190° C.

*Analysis.*—Calculated for $(C_8H_{16}N_4)_x$, C, 57.1; H, 9.6; N, 33.3. Observed: C, 54.7; H, 9.4; N, 34.6.

*Example 3*

26 parts of cyanogen is added over a period of 30 minutes to a vigorously stirred solution of 54 parts of p-phenylenediamine in 392 parts of absolute ethanol at 60–63° C. The mixture was stirred for 1 hour at 60° and then refluxed for 3 hours. Cooling and filtration yielded 70 parts of dark red solid. The polymer yield is 87.5%. The product is soluble in dilute mineral acids and has a molecular weight estimated by intrinsic viscosity measurements of 7,000–8,000.

Example 4

52 parts of cyanogen is dissolved in 392 parts of absolute ethanol in a creased reaction vessel. The temperature is maintained at 5–25° C. while ethylenediamine is added in small equal increments over a period of 35 minutes. The reaction mixture is rapidly stirred during this time. Thereafter, the mixture is stirred at 33–46° for 1 hour. On standing overnight, the mixture gels. Evaporation of the solvent yielded 70 parts of a brown solid polymer. The brown solid product is dissolved in dilute HCl, heated with decolorizing charcoal and precipitated with NaOH. A light tan solid was obtained which darkens at 265° C. and melts at 289° C.

The melting point indicates that this brown solid contains much of the biimidazole compound which has a melting point of 285–6° C.

The brown solid is found partially soluble in water, accordingly a water extraction is performed (biimidazole is water-insoluble). 31 parts of a brittle tan solid is obtained.

Example 5

78 parts of cyanogen is introduced into a reaction vessel containing 182 parts of 3,3'-oxybispropylamine and 1200 parts of ethyl alcohol at a temperature of 58° C. to 62° C. The mixture is stirred continuously for 75 minutes at 60° C. and then refluxed for 2.5 hours, cooled and filtered. The yield is 83.2%. The product is soluble in dilute 12% sulfuric acid and other mineral acids. The molecular weight by intrinsic viscosity measurements is 28,000.

Example 6

The procedure of Example 5 is repeated with the exception that 220 parts of 3,3'-thiobispropylamine is employed with 78 parts of cyanogen. The temperature is maintained at 60–61° C. with continued stirring for 2 hours and refluxed for an additional 3 hours. The filtered product is soluble in dilute 15% HCl and has a molecular weight of about 11,000, based on intrinsic viscosity measurements.

In preparing the novel polymeric composition, the cyanogen and diamine may be introduced simultaneously into the the reaction mixture containing the liquid organic medium or the diamine introduced into the organic liquid medium containing the cyanogen dissolved therein. Alternatively, cyanogen may be introduced into the organic liquid containing the diamine therein.

In the preferred procedure, the diamine is added to the liquid organic reaction medium containing cyanogen dissolved therein, particularly where the diamine employed is ethylenediamine. The reaction of ethylene-diamine and cyanogen readily yields tetrahydro-2,2'-biimidazole. This reaction requires the addition of 2 moles of ethylenediamine to 1 mole of cyanogen. In order to enhance the chances of obtaining a polymer, the mole ratio of reactants will be adjusted to 1:1 and the ethylenediamine will be added to a solvent containing the cyanogen in order that cyanogen will always be in excess.

The average molecular weight of the novel addition products of the invention as noted above may vary between about 1,000 and 50,000, but is ordinarily within the range of from about 2,000 to 15,000 as calculated from viscosity measurements using the Staudinger equation or by determining the average molecular weight by other known methods and converting the value thereby obtained to a Staudinger molecular weight.

The novel addition polymerization products prepared according to the present invention may be utilized in various applications, including surface coatings, molding compositions, as chelating agents, lubricating oil modifiers, and the like.

I claim:

1. An addition polymerization product of cyanogen and a diamine having the formula:

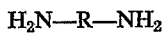

wherein R is selected from the group consisting of alkylene radicals of 2 to 12 carbon atoms, an arylene radical, an oxyether radical and a thioether radical in molar proportions of from about 0.8:1.0 to 3:1, respectively, wherein said addition polymerization product has the recurring unit:

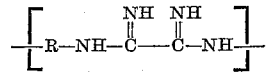

wherein R is as defined above and is the residue of said diamine.

2. The addition polymerization product of cyanogen and ethylenediamine in molar proportions of from about 0.9:1 to about 1.5:1, respectively, wherein said addition polymerization product has the recurring unit:

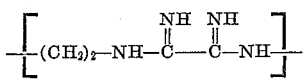

3. The addition polymerization product of cyanogen and tetramethylenediamine in molar proportions of from about 0.9:1 to about 1.5:1, respectively, wherein said addition polymerization product has the recurring unit:

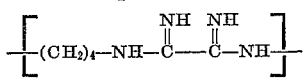

4. The addition polymerization product of cyanogen and hexamethylenediamine in molar proportions of from about 0.9:1 to about 1.5:1, respectively, wherein said addition polymerization product has the recurring unit:

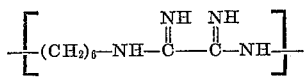

5. The addition polymerization product of cyanogen and p-phenylenediamine in molar proportions of from about 0.9:1 to about 1.5:1, respectively, wherein said addition polymerization product has the recurring unit:

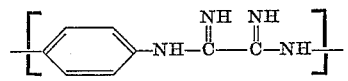

6. The addition polymerization product of cyanogen and 3,3'-oxybispropylamine in molar proportions of from about 0.9:1 to about 1.5:1, respectively, wherein said addition polymerization product has the recurring unit:

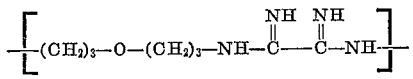

7. A process for preparing an addition polymerization product of cyanogen and a diamine having the formula:

wherein R is selected from the group consisting of alkylene radicals of 2–12 carbon atoms, an arylene radical, an oxy ether radical and a thioether radical, which comprises reacting cyanogen and said diamine in molar proportions of from about 0.8:1 to about 3:1, respectively in an organic solvent at a temperature not exceeding about 70° C.

8. A process for preparing an addition polymerization product of cyanogen and ethylenediamine which comprises reacting cyanogen and ethylenediamine in molar proportions of from about 0.9:1 to 1.5:1, respectively, in an organic solvent at a temperature not exceeding about 70° C.

9. A process for preparing an addition polymerization product of cyanogen and tetramethylenediamine which comprises reacting cyanogen and tetraethylenediamine in molar proportions of from about 0.9:1 to about 1.5:1, respectively, in an organic solvent at a temperature not exceeding about 70° C.

10. A process for preparing an addition polymerization product of cyanogen and hexamethylenediamine which comprises reacting cyanogen and hexamethylenediamine in molar proportions of from about 0.9:1 to about 1.5:1, respectively, in an organic solvent at a temperature not exceeding about 70° C.

11. A process for preparing an addition polymerization product of cyanogen and p-phenylenediamine which comprises reacting cyanogen and p-phenylenediamine in molar proportions of from about 0.9:1 to about 1.5:1, respectively, in an organic solvent at a temperature not exceeding about 70° C.

12. A process for preparing an addition polymerization product of cyanogen and 3,3'-oxybispropylamine which comprises reacting cyanogen and 3,3'-oxybispropylamine in molar proportions of from about 0.9:1 to about 1.5:1, respectively, in an organic solvent at a temperature not exceeding about 70° C.

References Cited in the file of this patent
UNITED STATES PATENTS 2,819,262    Matsuda _____ Jan. 7, 1958

OTHER REFERENCES

Woodburn et al.: "Jour. of Organic Chem.," vol. 17, pp. 1235–9, 1952.

Woodburn et al.: "Jour. of Organic Chem.," vol. 14, pp. 555–8, 1949; vol. 15, pp. 535–8, 1950; vol. 16, pp. 1389–91, 1951; vol. 22, pp. 895–899, 1957.